United States Patent
Yamanashi et al.

(10) Patent No.: US 12,308,580 B2
(45) Date of Patent: May 20, 2025

(54) SHIELD CONNECTOR WITH IMPROVED STABILITY BETWEEN SHELL AND BRAID

(71) Applicant: Yazaki Corporation, Tokyo (JP)

(72) Inventors: Daisuke Yamanashi, Shizuoka (JP); Takashi Sone, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 342 days.

(21) Appl. No.: 17/966,740

(22) Filed: Oct. 14, 2022

(65) Prior Publication Data
US 2023/0122368 A1    Apr. 20, 2023

(30) Foreign Application Priority Data
Oct. 20, 2021   (JP) .................... 2021-171272

(51) Int. Cl.
*H01R 13/6592*   (2011.01)
*H01R 13/52*   (2006.01)

(52) U.S. Cl.
CPC ..... *H01R 13/6592* (2013.01); *H01R 13/5205* (2013.01)

(58) Field of Classification Search
CPC .................................. H01R 13/5205
USPC .......................................... 439/589
See application file for complete search history.

(56) References Cited

U.S. PATENT DOCUMENTS

| | | | |
|---|---|---|---|
| 11,296,456 B2 | 4/2022 | Takagi et al. | |
| 2012/0270444 A1* | 10/2012 | Kawamura | H01R 13/5202 439/607.44 |
| 2014/0370753 A1* | 12/2014 | Kobayashi | H01R 13/5216 439/607.41 |
| 2015/0017829 A1* | 1/2015 | Ishikawa | H01R 13/65912 439/460 |
| 2020/0176924 A1* | 6/2020 | Azad | H01R 13/533 |
| 2024/0356288 A1* | 10/2024 | Iwakura | H01R 13/6592 |

FOREIGN PATENT DOCUMENTS

| | | | | |
|---|---|---|---|---|
| JP | 2020155306 A | * | 9/2020 | ............ B66C 1/16 |
| JP | 2021-39889 A | | 3/2021 | |

* cited by examiner

*Primary Examiner* — Abdullah A Riyami
*Assistant Examiner* — Amara Anderson
(74) *Attorney, Agent, or Firm* — KENEALY VAIDYA LLP

(57) ABSTRACT

A shield connector includes: a housing that includes a first engaging portion and a first facing wall; an annular sealing member; a holder that includes a second engaging portion and a second facing wall, and supports the sealing member; a tubular shell that includes a first insertion opening that the housing is inserted into, a first end face that surrounds the first insertion opening, a second insertion opening that the holder is inserted into, and a second end face that surrounds the second insertion opening, and a braid. The housing and the holder cause the first engaging portion and the second engaging portion to be engaged with each other inside the shell, cause the first facing wall to face the first end face, and cause the second facing wall to face the second end face, and the housing and the holder are coupled to each other.

6 Claims, 11 Drawing Sheets

SHIELD CONNECTOR WITH IMPROVED STABILITY BETWEEN SHELL AND BRAID

CROSS-REFERENCE TO RELATED APPLICATION(S)

The present application claims priority to and incorporates by reference the entire contents of Japanese Patent Application No. 2021-171272 filed in Japan on Oct. 20, 2021.

BACKGROUND OF THE INVENTION

1. Field of the Invention

The present invention relates to a shield connector.

2. Description of the Related Art

Conventionally, shield connectors have been proposed. Japanese Patent Application Laid-open No. 2021-39889 discloses a shield connector that includes a housing, a rear holder that is held by the housing, a shield shell, and a braid that is pressed against an outer peripheral wall of the shield shell.

In a case where a shell is engaged with a housing or the like, the shell is provided with a cutout, an opening, a projection, or the like. In a case where these structures are disposed in a region of contact with a braid, variations in an area of contact between the shell and the braid are easily generated. It is desirable that the area of contact between the shell and the braid be stabilized.

SUMMARY OF THE INVENTION

It is an object of the present invention to provide a shield connector that is capable of stabilizing an area of contact between a shell and a braid.

In order to solve the above mentioned problem and achieve the object, a shield connector according to one aspect of the present invention includes a housing that includes a first engaging portion and a first facing wall, and houses and holds a terminal, the housing having a tubular shape; a sealing member that seals a gap between an outer peripheral face of an electric wire and an inner wall face of the housing, the sealing member having an annular shape, the electric wire being connected to the terminal; a holder that includes a second engaging portion and a second facing wall, and supports the sealing member, the second engaging portion being engaged with the first engaging portion; a shell that includes a first insertion opening that the housing is inserted into, a first end face that surrounds the first insertion opening, a second insertion opening that the holder is inserted into, and a second end face that surrounds the second insertion opening, the shell having electric conductivity and having a tubular shape; and a braid that is fixed to an outer peripheral face of the shell, wherein the housing and the holder cause the first engaging portion and the second engaging portion to be engaged with each other inside the shell, cause the first facing wall to face the first end face, and cause the second facing wall to face the second end face, and the housing and the holder are coupled to each other.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A shield connector according to an embodiment of the present invention is described in detail below with reference to the drawings. Note that this embodiment is not restrictive of this invention. In addition, components in the embodiment described below include components that those skilled in the art could easily conceive of, or substantially the same components.

Embodiment

Figure 1:
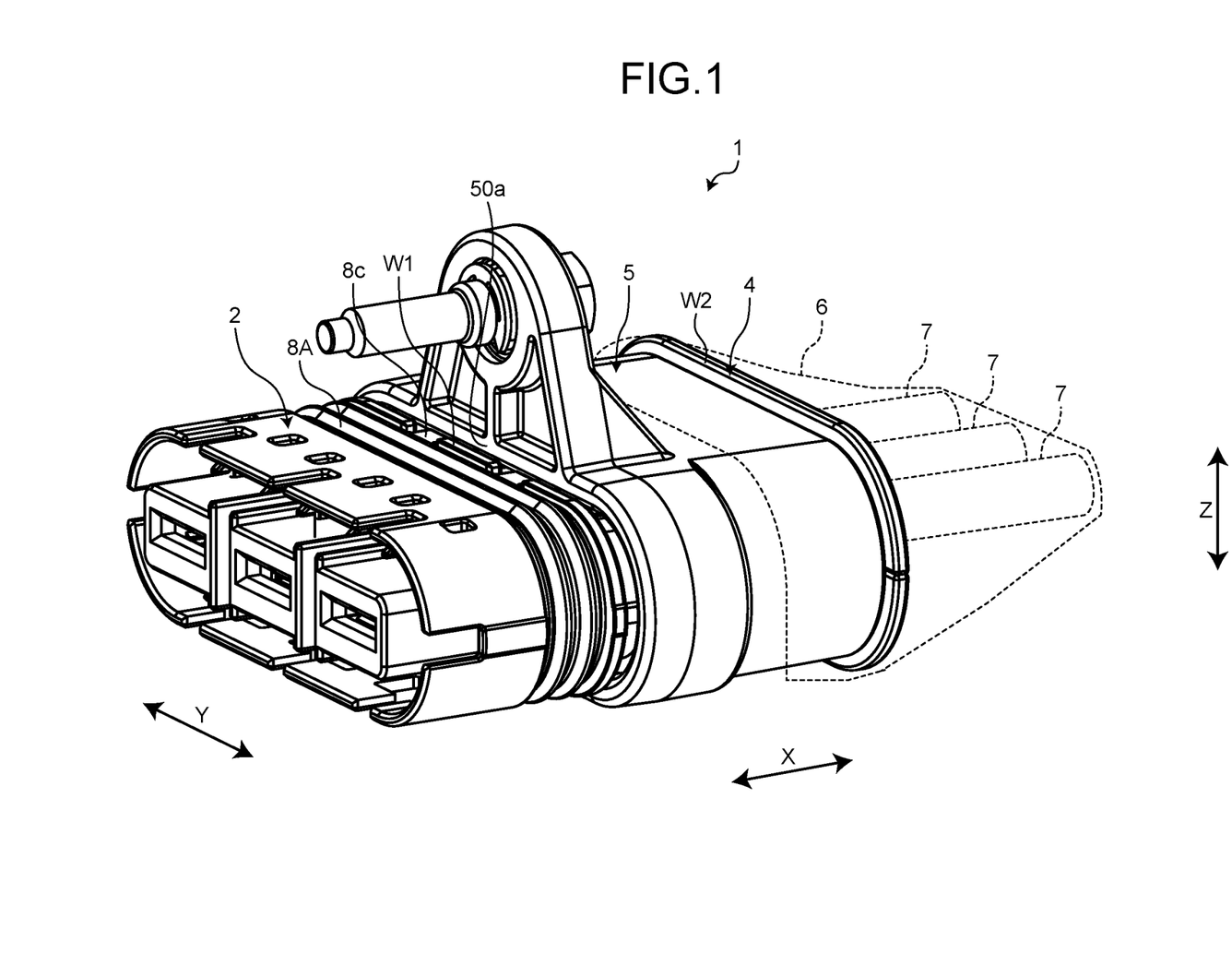
FIG. 1 is a perspective view of a shield connector according to an embodiment.
Figure 2:
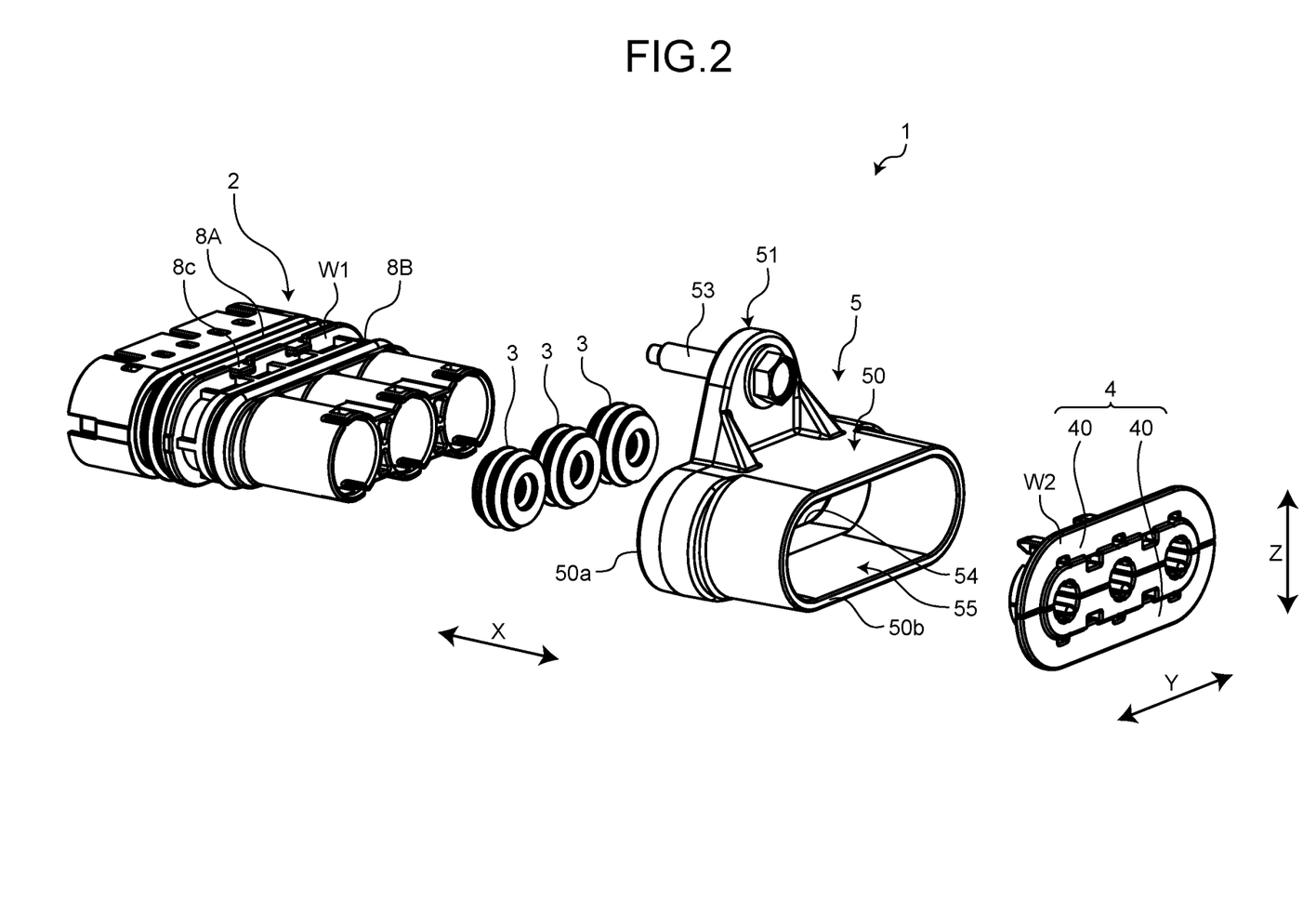
FIG. 2 is an exploded perspective view of the shield connector according to the embodiment.
Figure 3:
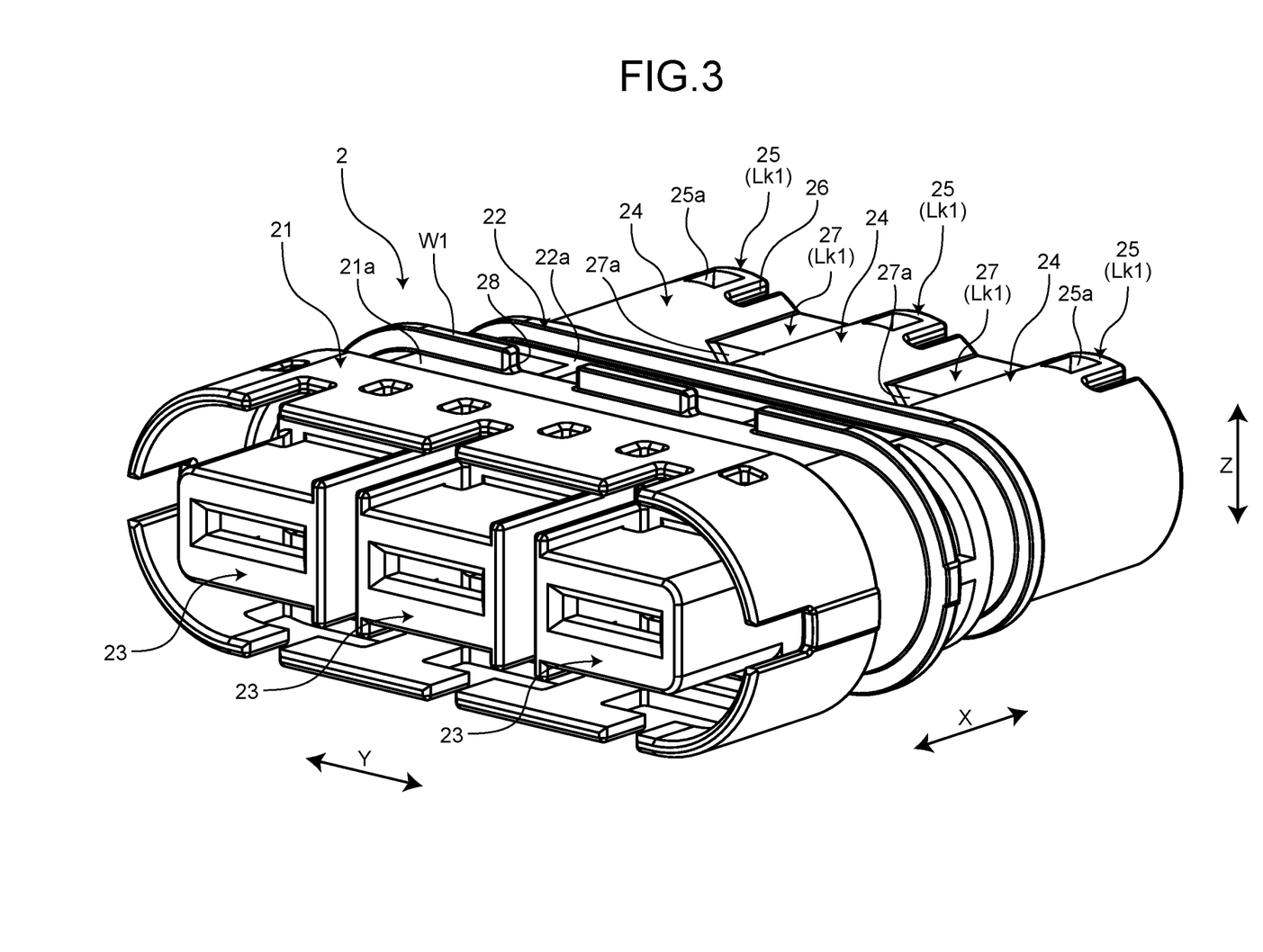
FIG. 3 is a perspective view of a housing according to the embodiment.
Figure 4:
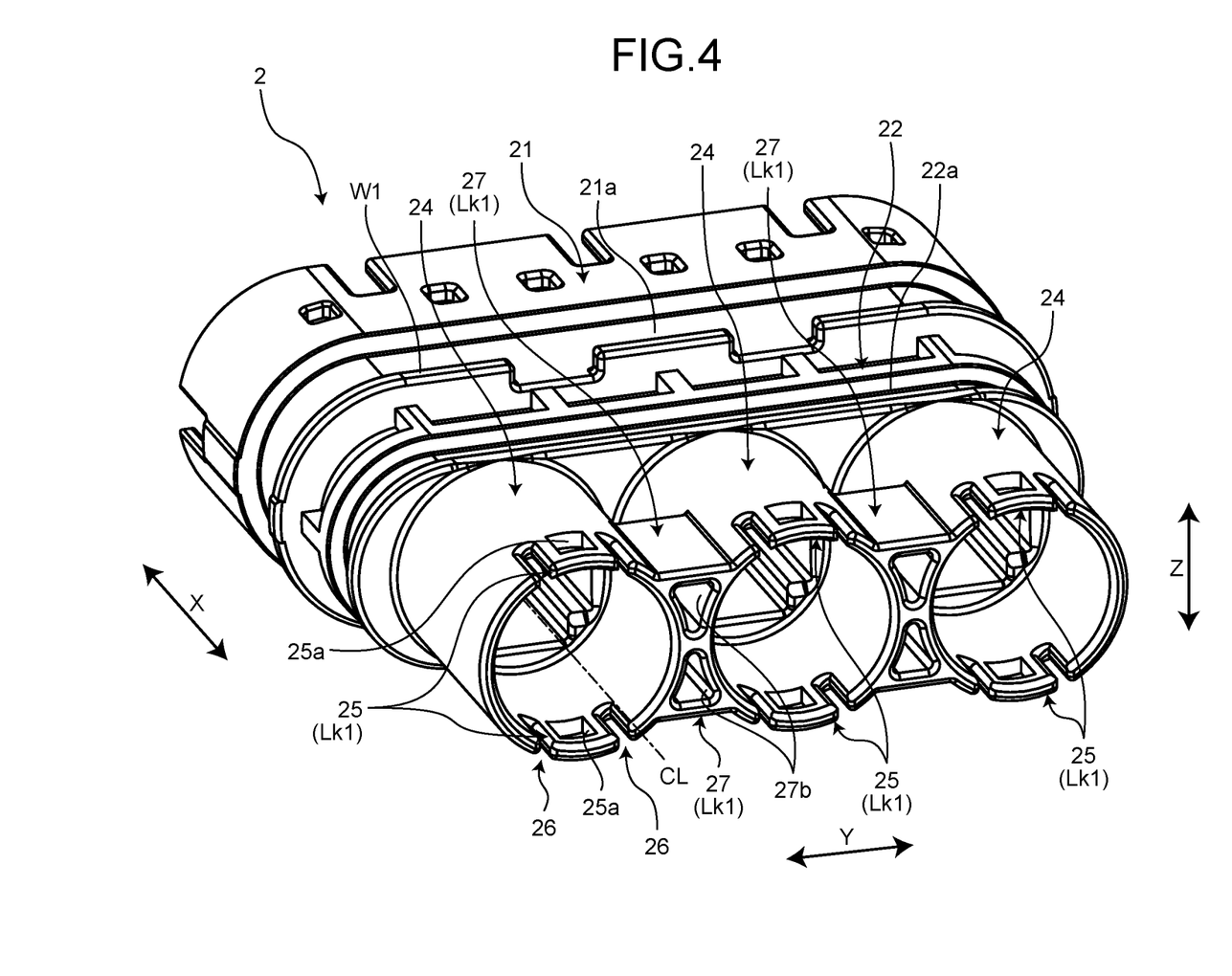
FIG. 4 is a perspective view of the housing according to the embodiment.
Figure 5:
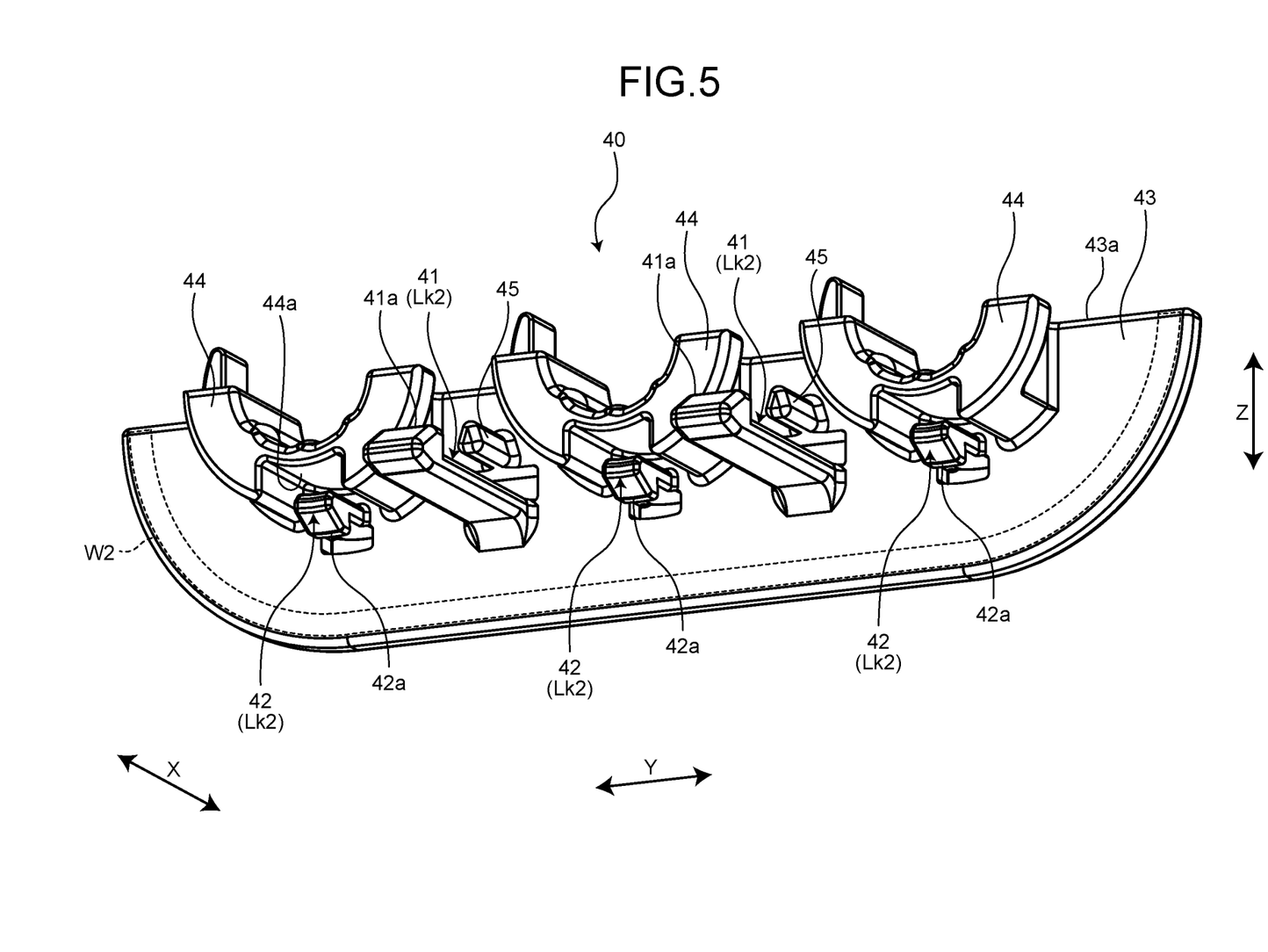
FIG. 5 is a perspective view of a support according to the embodiment.
Figure 6:
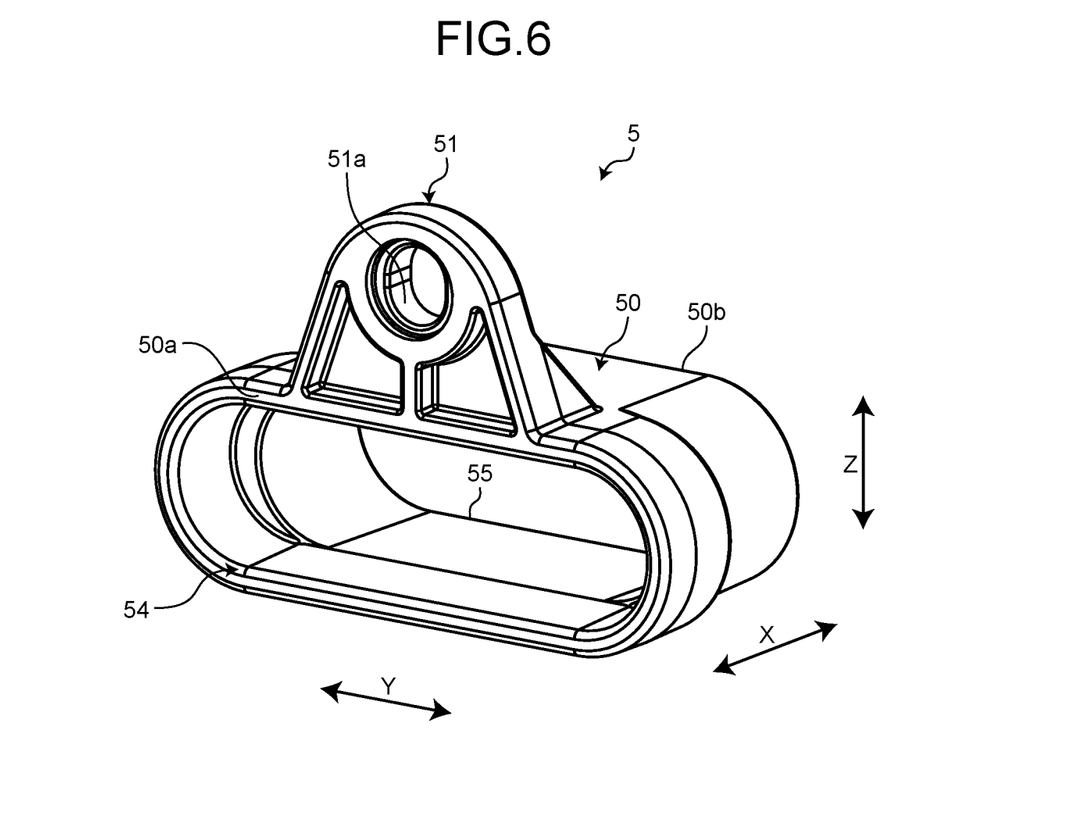
FIG. 6 is a perspective view of a shell according to the embodiment.
Figure 7:
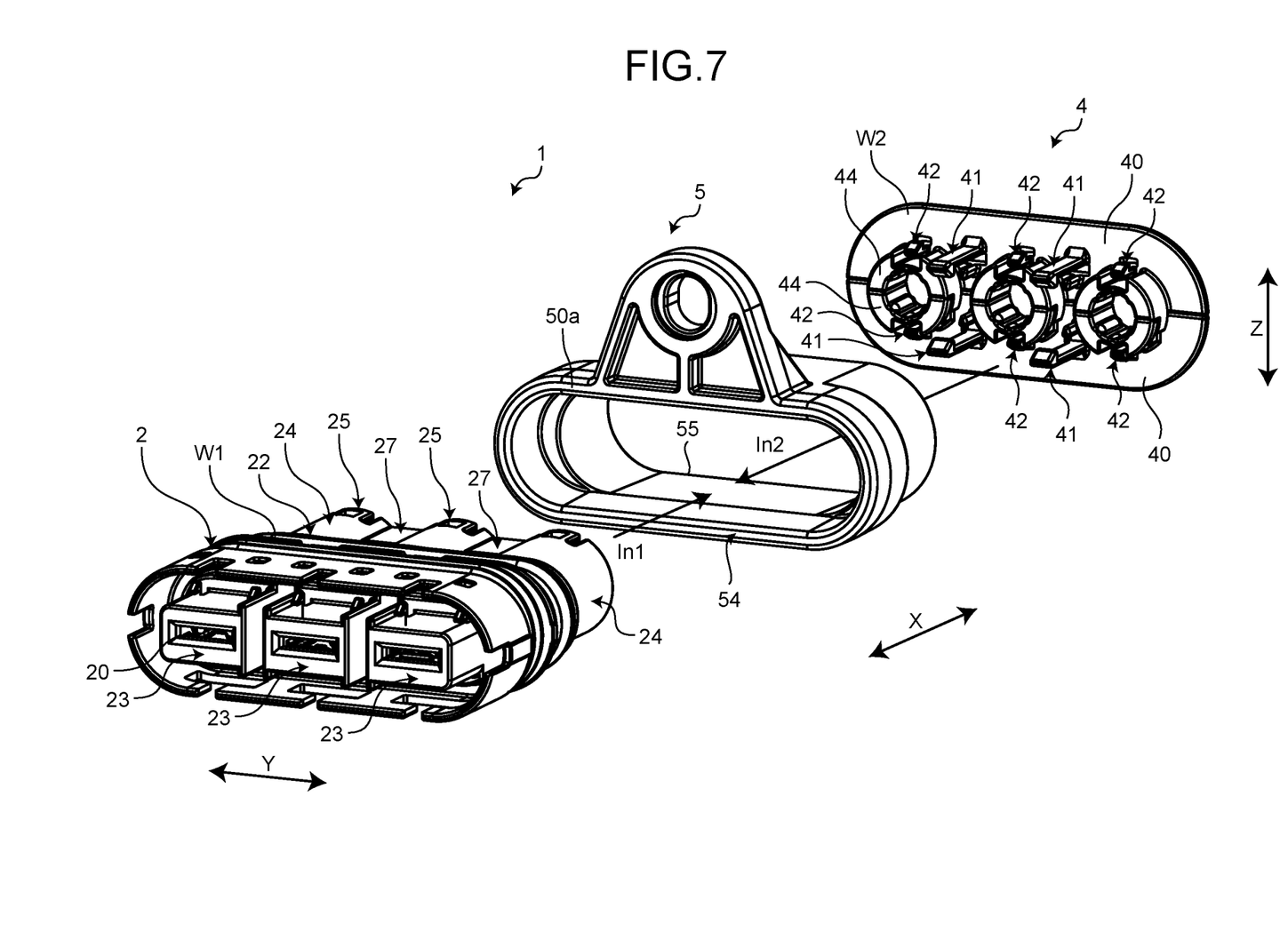
FIG. 7 is a perspective view of a process of mounting the shield connector according to the embodiment.
Figure 8:
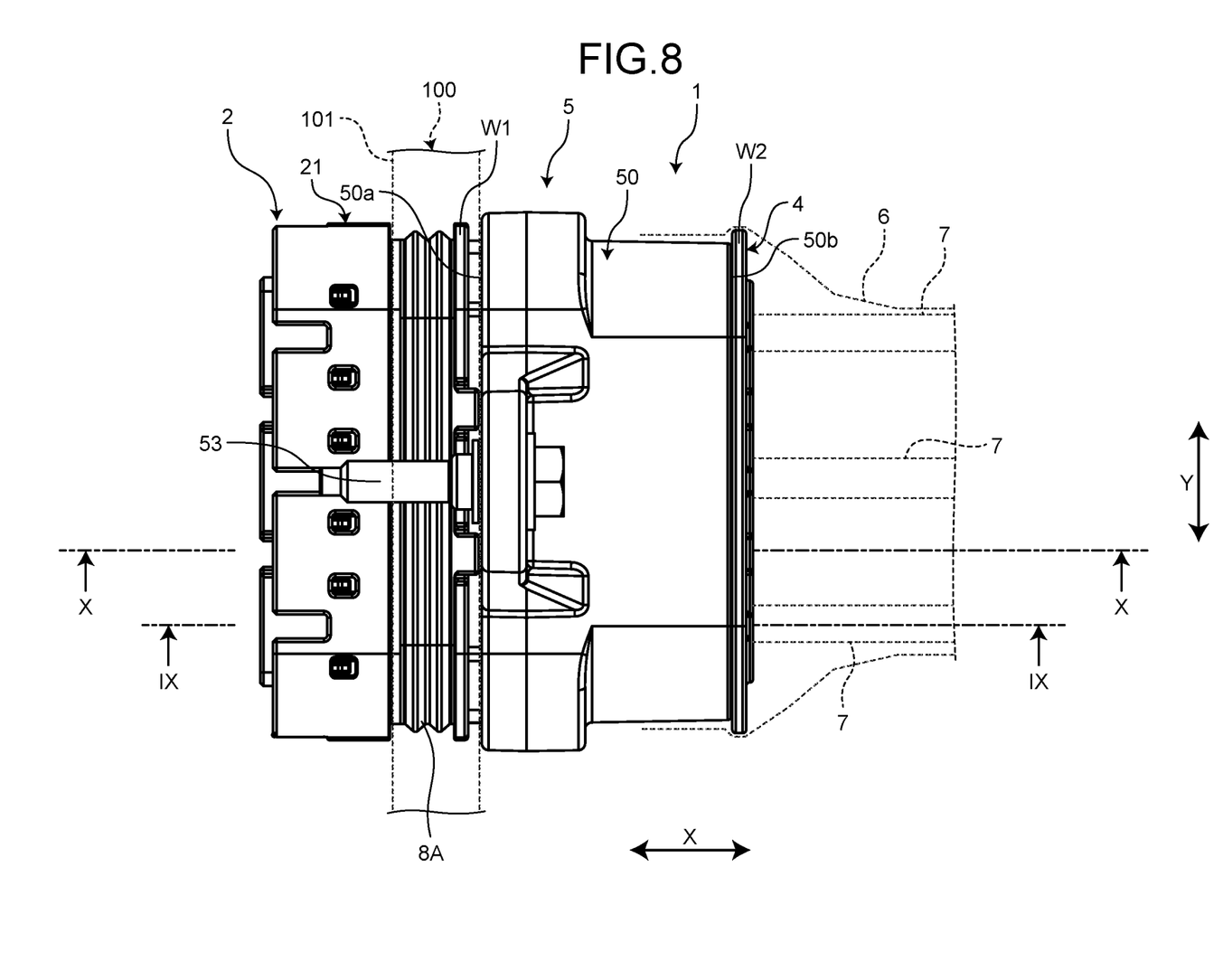
FIG. 8 is a plan view of the shield connector according to the embodiment.
Figure 10:
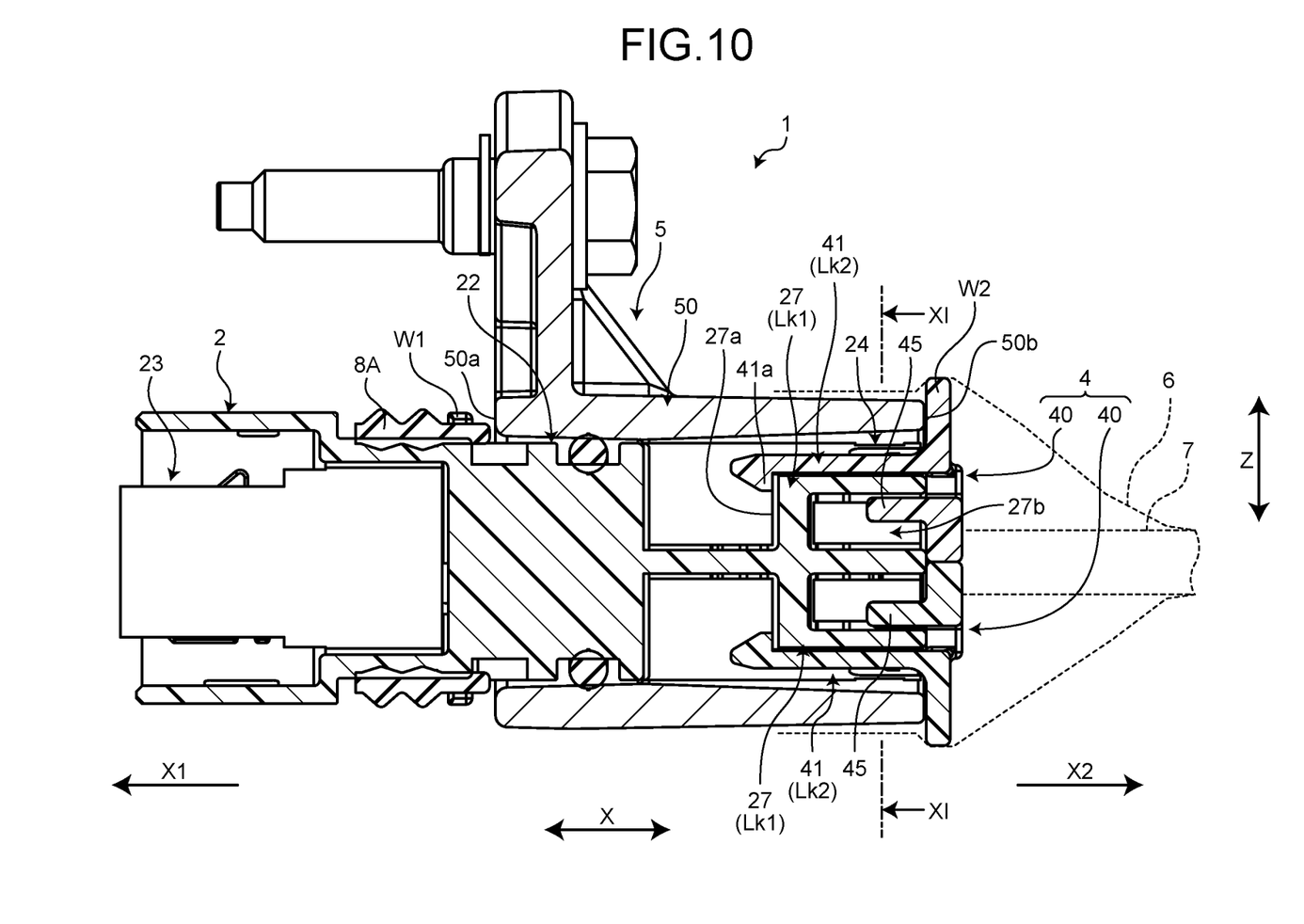
FIG. 10 is a sectional view of the shield connector according to the embodiment.
Figure 11:
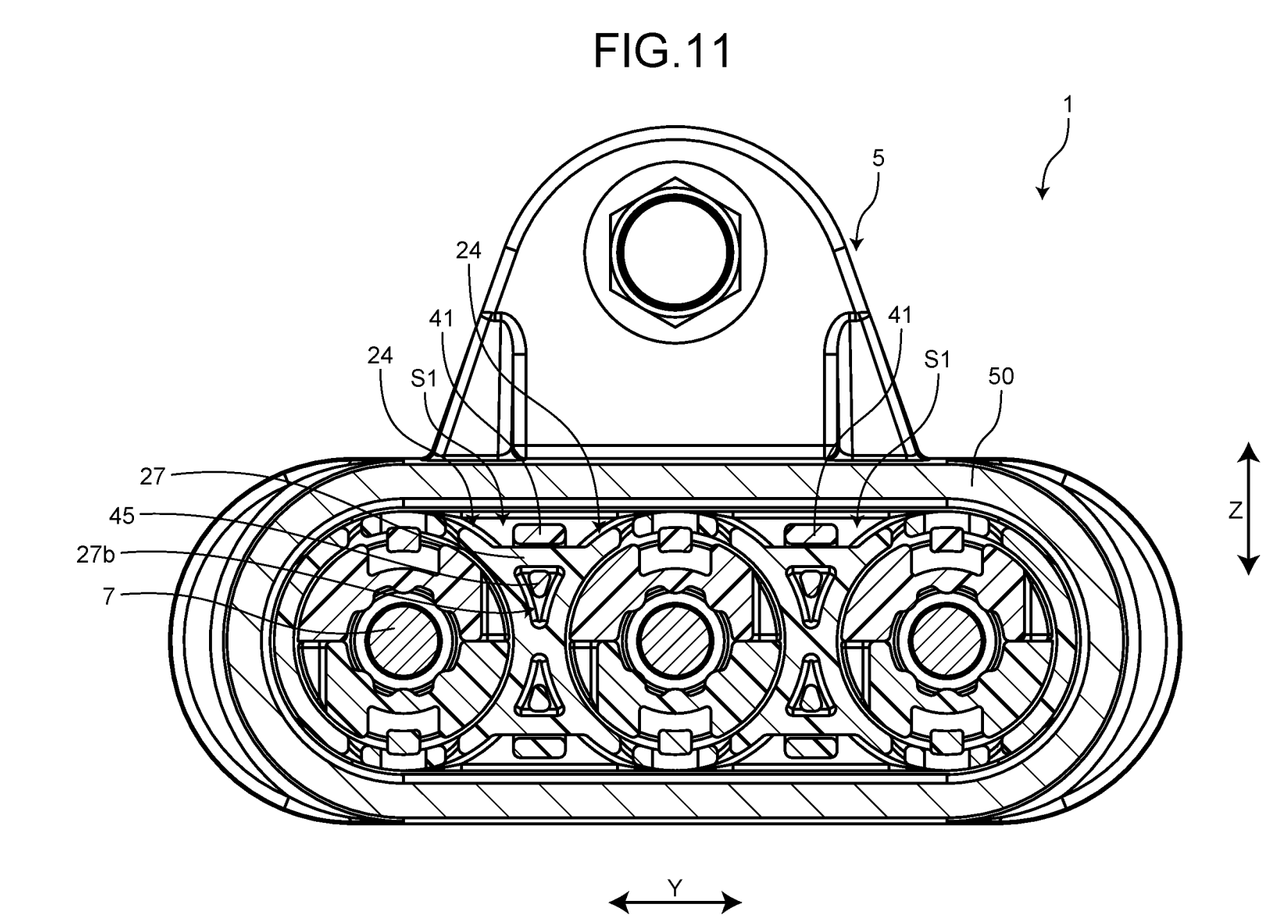
FIG. 11 is a sectional view of the shield connector according to the embodiment.

An embodiment is described with reference to FIGS. 1 to 11. The present embodiment relates to a shield connector. FIG. 1 is a perspective view of a shield connector according to the embodiment; FIG. 2 is an exploded perspective view of the shield connector according to the embodiment; FIGS. 3 and 4 are perspective views of a housing according to the embodiment; FIG. 5 is a perspective view of a support according to the embodiment; FIG. 6 is a perspective view of a shell according to the embodiment; FIG. 7 is a perspective view of a process of mounting the shield connector according to the embodiment; FIG. 8 is a plan view of the shield connector according to the embodiment; and FIGS. 9 to 11 are sectional views of the shield connector according to the embodiment.

Figure 9:
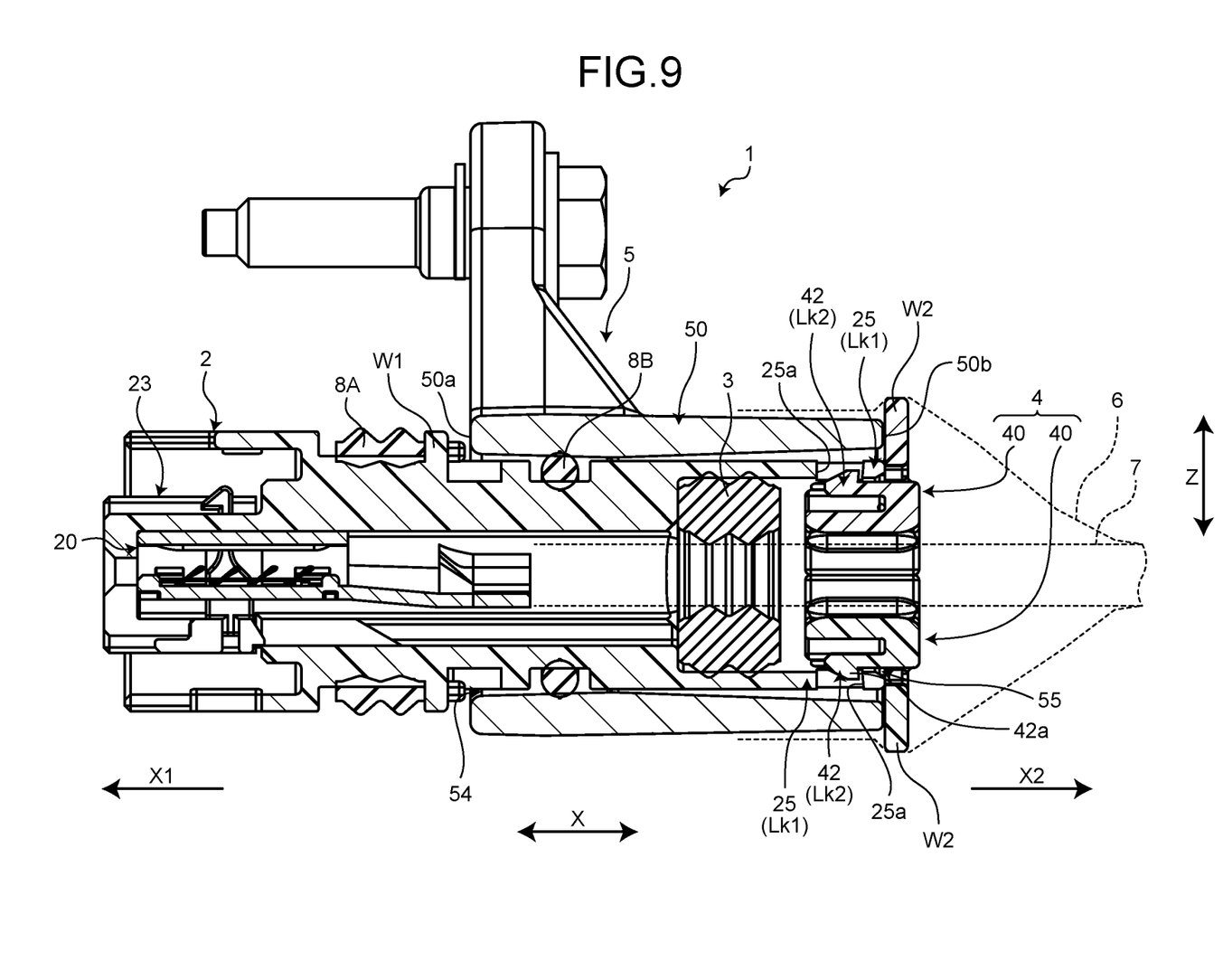
FIG. 9 is a sectional view of the shield connector according to the embodiment.

FIG. 9 illustrates cross section IX-IX of FIG. 8. FIG. 10 illustrates cross section X-X of FIG. 8. FIG. 11 illustrates cross section XI-XI of FIG. 10.

A shield connector 1 according to the present embodiment is connected to, for example, a device that is equipped in a vehicle such as an automobile. As illustrated in FIGS. 1 and 2, the shield connector 1 includes a housing 2, a sealing member 3, a holder 4, and a shell 5. The shield connector 1 is connected to an electric wire 7 that is covered with a braid 6. The shell 5 is a tubular member that has been formed by using metal having electric conductivity, and is referred to as a shield shell. An end portion of the braid 6 is fixed to an outer peripheral face of the shell 5 by using a ring-shaped caulking member or the like. The shell 5 is fixed to a casing of a device serving as a counterpart of connection, and is electrically connected to this casing. Stated another way, the braid 6 is grounded to the casing of the device with the shell 5 interposed therebetween.

The housing 2 is a tubular member that houses and holds a terminal that is connected to an end portion of the electric wire 7. The housing 2 is formed by using, for example, an insulating synthetic resin. The electric wire 7 is led out from an end portion of the housing 2 to an outside. The sealing member 3 is an annular member that seals a gap between an outer peripheral face of the electric wire 7 and an inner wall face of the housing 2. The sealing member 3 is formed by using, for example, an elastic resin. The holder 4 is a member that is coupled to the housing 2, and supports the sealing member 3. The holder 4 is formed by using, for example, an insulating synthetic resin. The illustrated holder 4 is configured by combining two supports 40.

The housing 2 and the holder 4 are inserted into the shell 5, and are engaged with each other inside the shell 5. The housing 2 and the holder 4 respectively include facing walls W1 and W2 that face end faces 50a and 50b of the shell 5. A first facing wall W1 included in the housing 2 faces a first end face 50a of the shell 5, and a second facing wall W2 included in the holder 4 faces a second end face 50b of the shell 5. The housing 2 and the holder 4 sandwich the shell 5 by using the two facing walls W1 and W2, and are fixed to the shell 5. In the shield connector 1 according to the present embodiment, a protrusion portion or a recess portion that is used to fix the housing 2 to the shell 5 is not needed. Accordingly, the shield connector 1 according to the present embodiment sufficiently secures an area of contact between the outer peripheral face of the shell 5 and the braid 6, and can improve the stability of shield performance.

As illustrated in FIGS. 3 and 4, the housing 2 is formed in a flat tubular shape that linearly extends. In the description below, an axis direction of the housing 2 is referred to as an "axis direction X", and a width direction of the housing 2 is referred to as a "width direction Y". The electric wire 7 is led out from the housing 2 along the axis direction X. The housing 2 holds a plurality of electric wires 7 that is arranged in the width direction Y. A direction that is orthogonal to both the axis direction X and the width direction Y is referred to as a "height direction Z".

The housing 2 includes a first fitting portion 21, a second fitting portion 22, a plurality of holding portions 23, and a plurality of tubes 24. The first fitting portion 21 is located at one end of the axis direction X in the housing 2. The plurality of tubes 24 is located at another end of the axis direction X in the housing 2. The second fitting portion 22 is located between the first fitting portion 21 and the tubes 24.

The first fitting portion 21 is fitted into an opening portion that is provided in the casing of the device. A shape of the first fitting portion 21 is a tubular shape having an elliptic cross-sectional shape. An outer wall face of the first fitting portion 21 includes a groove 21a that a first sealing member 8A is attached to. The holding portion 23 is a portion that holds a terminal 20. The holding portion 23 is disposed inside the first fitting portion 21, and extends in the axis direction X. The housing 2 according to the present embodiment includes three holding portions 23 that are arranged in the width direction Y. The illustrated holding portion 23 has a rectangular tubular shape.

The second fitting portion 22 is a portion that is fitted into the shell 5. A shape of the second fitting portion 22 is a tubular shape having an elliptic cross-sectional shape. An outer wall face of the second fitting portion 22 includes a groove 22a that a second sealing member 8B is attached to.

As illustrated in FIGS. 3 and 4, the tube 24 has a cylindrical shape, and protrudes from the second fitting portion 22 along the axis direction X. The housing 2 according to the present embodiment includes three tubes 24 that are arranged in the width direction Y. Each of the tubes 24 houses a single sealing member 3. Each of the tubes 24 includes two engaging pieces 25. The engaging piece 25 is a piece that is disposed at a distal end of the tube 24, and includes an engaging hole 25a. The tube 24 includes a slit 26 that has been formed between the engaging piece 25 and another portion of the tube 24. The slit 26 is disposed on both sides in a circumferential direction relative to the engaging piece 25, and extends in the axis direction X.

The two engaging pieces 25 are disposed symmetrically relative to a central axis line CL of the tube 24. In other words, phases of the two engaging pieces 25 are shifted from each other by 180°. The two engaging pieces 25 face each other in the height direction Z. A shape of the engaging piece 25 when viewed from the height direction Z is a roughly rectangular shape. The engaging hole 25a penetrates the engaging piece 25 along a thickness direction of the engaging piece 25.

The housing 2 includes a connecting wall 27 that connects two adjacent tubes 24 along the width direction Y. The connecting wall 27 connects an outer peripheral face of a tube 24 and an outer peripheral face of another tube 24 that is adjacent to the tube 24. As illustrated in FIG. 3, the connecting wall 27 includes a latching wall 27a that extends in the height direction Z. The latching wall 27a is located in an end portion on a side of the second fitting portion 22 in the connecting wall 27. As illustrated in FIG. 4, the connecting wall 27 has been formed on both sides in the height direction Z relative to the central axis line CL. The connecting walls 27 form a hollow portion 27b. The hollow portion 27b is surrounded with the connecting walls 27 and the outer peripheral face of the tube 24.

In the housing 2, the engaging piece 25 and the connecting wall 27 are provided as a first engaging portion Lk1 that is engaged with the holder 4.

The housing 2 includes the first facing wall W1. The first facing wall W1 is a wall that faces the first end face 50a of the shell 5 in the axis direction X, and is latched together by the first end face 50a. The first facing wall W1 is a rib that is disposed between the first fitting portion 21 and the second fitting portion 22. The first facing wall W1 protrudes from an outer peripheral face of the housing 2 in a direction that is orthogonal to the axis direction X. The first facing wall W1 extends over the entire circumference along the circumferential direction. The first facing wall W1 forms the groove 21a, and includes a plurality of cutouts 28. A piece 8c of the first sealing member 8A is inserted into the cutout 28. As illustrated in FIG. 2, the holder 4 according to the present embodiment includes two supports 40 having the same shape. The two supports 40 are combined, and therefore an elliptic closing wall that closes a second insertion opening 55 of the shell 5 is formed. As illustrated in FIG. 5, the support 40 includes a body 43 having a flat plate shape, a first engaging piece 41, a second engaging piece 42, a support wall 44, and a pillar 45. The body 43 is the closing wall that closes the second insertion opening of the shell 5. A shape of the body 43 in a case where the body 43 is viewed from the axis direction X is a half-elliptic shape. The body 43 includes an abutting face 43a having a linear shape along the width direction Y. The two supports 40 are coupled to the housing 2 in a state where the abutting faces 43a abut onto each other.

The body 43 includes the second facing wall W2. The second facing wall W2 is a portion that faces the second end face 50b of the shell 5, and is latched together by the second end face 50b. The second facing wall W2 is an edge of the body 43, and extends to surround the first engaging piece 41, the second engaging piece 42, and the support wall 44.

The first engaging piece 41, the second engaging piece 42, the support wall 44, and the pillar 45 protrude from the body 43 in the axis direction X. The support wall 44 is a portion that is inserted into the tube 24, and supports the sealing member 3. The support wall 44 has a half-tubular shape. The support 40 includes three support walls 44 that are arranged in the width direction Y. An outer peripheral face of the support wall 44 is provided with a groove 44a along the axis direction X.

The first engaging piece 41 is disposed between two adjacent support walls 44. The first engaging piece 41 is engaged with the connecting wall 27 of the housing 2. The first engaging piece 41 has an arm shape, and has flexibility. The support 40 includes two first engaging pieces 41 that are arranged in the width direction Y. A distal end of the first engaging piece 41 includes a protrusion 41a that protrudes toward a side of the abutting face 43a.

The pillar 45 is disposed between two adjacent support walls 44. The pillar 45 faces the first engaging piece 41 in the height direction Z. More specifically, the pillar 45 faces a face that includes the protrusion 41a in the first engaging piece 41. A protrusion length of the pillar 45 is smaller than a protrusion length of the first engaging piece 41.

The second engaging piece 42 is disposed in the groove 44a. The second engaging piece 42 is engaged with the engaging piece 25 of the housing 2. The second engaging piece 42 has an arm shape, and has flexibility. The support 40 includes three second engaging pieces 42 that are arranged in the width direction Y. A distal end of the second engaging piece 42 includes a protrusion 42a that protrudes toward a side that is opposite to the side of the abutting face 43a.

In the holder 4, the first engaging piece 41 and the second engaging piece 42 are provided as a second engaging portion Lk2 that is engaged with the housing 2.

As illustrated in FIG. 2, the shell 5 includes a body 50 having a cylindrical shape, and a fixing portion 51. A shape of the body 50 on a cross section that is orthogonal to the axis direction X is an elliptic shape. The fixing portion 51 protrudes from an outer wall face of the body 50 in the height direction Z. The fixing portion 51 includes a through-hole 51a that a fastening member 53 can pass through.

As illustrated in FIGS. 2 and 6, the shell 5 includes a first insertion opening 54, the first end face 50a, the second insertion opening 55, and the second end face 50b. The first insertion opening 54 is an opening portion into which the housing 2 is inserted. The second insertion opening 55 is an opening portion into which the holder 4 is inserted. The first insertion opening 54 is located at one end in the axis direction X in the body 50, and is open in the axis direction X. The second insertion opening 55 is located at another end in the axis direction in the body 50, and is open in the axis direction X.

The first end face 50a is an end face that surrounds the first insertion opening 54. The first end face 50a is a flat face that is directed in the axis direction X, and has an elliptic shape. The second end face 50b is an end face that surrounds the second insertion opening 55. The second end face 50b is a flat face that is directed in the axis direction X, and has an elliptic shape. The first end face 50a and the second end face 50b are directed in directions opposite to each other.

As illustrated in FIG. 7, the housing 2 and the holder 4 are inserted into the shell 5. The housing 2 is inserted into the shell 5 along the axis direction X from the first insertion opening 54. The tube 24 of the housing 2 is housed in an internal space of the shell 5, and the second fitting portion 22 is fitted into the shell 5. The housing 2 is inserted into the shell 5 to be located in a position where the first facing wall W1 faces the first end face 50a. Note that the electric wire 7 is passed through the shell 5, but this is not illustrated in FIG. 7.

The holder 4 is inserted into the shell 5 along the axis direction X from the second insertion opening 55. Stated another way, an insertion direction In1 of the housing 2 relative to the shell 5 is opposite to an insertion direction In2 of the holder 4 relative to the shell 5. The first engaging piece 41, the second engaging piece 42, and the support wall 44 of the holder 4 are inserted into the internal space of the shell 5. The first engaging piece 41 is engaged with the connecting wall 27 of the housing 2 inside the shell 5. The second engaging piece 42 is engaged with the engaging piece 25 of the housing 2 inside the shell 5. The housing 2 and the holder 4 are coupled to each other, and sandwich the shell 5 by using the first facing wall W1 and the second facing wall W2. By doing this, the mounting of the housing 2 and the holder 4 on the shell 5 is completed.

As illustrated in FIG. 8, the shield connector 1 is installed in a wall 101 included in a casing 100 of the device. The first fitting portion 21 of the housing 2 is inserted into an opening portion included in the wall 101, and is fitted into the opening portion. The first sealing member 8A seals a gap between the opening portion and the housing 2. The shell 5 is fixed to the wall 101 by the fastening member 53. The fastening member 53 is, for example, a bolt that is inserted into the through-hole 51a of the shell 5. In this case, the fastening member 53 that has been inserted into the wall 101 is screwed into a nut. The holding portion 23 of the housing 2 is connected to, for example, a connector of the device. The terminal 20 is connected to a terminal included in a connector of a counterpart.

As illustrated in FIG. 9, the second engaging piece 42 of the holder 4 is engaged with the engaging piece 25 of the housing 2 from the inside. The protrusion 42a of the second engaging piece 42 enters the engaging hole 25a, and is latched together by the engaging piece 25. The terminal 20 is housed in the holding portion 23 of the housing 2, and is held by the holding portion 23. The electric wire 7 that is connected to the terminal 20 passes through the sealing member 3 and the holder 4, and is led out to the outside.

The braid 6 is fixed to the outer peripheral face of the body 50 of the shell 5, and is electrically connected to the shell 5. The shell 5 according to the present embodiment can stabilize an area of contact between the outer peripheral face of the body 50 and the braid 6. As a comparative example, a shell that is provided with a projection, a through-hole, or a cutout for engagement with a housing 2 or a holder 4 in a region of contact with a braid 6 is examined. In the shell of the comparative example, the presence of the projection, the through-hole, or the cutout easily causes variations in an area of contact between the shell and the braid 6. In the shield connector 1 according to the present embodiment, such a projection, through-hole, or cutout does not need to be provided in the shell 5. Accordingly, the shield connector 1 according to the present embodiment can stabilize an area of contact between the shell 5 and the braid 6.

As illustrated in FIG. 10, the first engaging piece 41 of the holder 4 is engaged with the connecting wall 27 of the housing 2 from the outside. The protrusion 41a of the first engaging piece 41 is latched together by the latching wall 27a of the connecting wall 27. The latching wall 27a is a face that crosses the axis direction X, and extends in the height direction Z. The latching wall 27a faces the second fitting portion 22 in the axis direction X.

As illustrated in FIG. 11, the first engaging piece 41 is inserted into a space S1 between two adjacent tubes 24. An engaging structure is disposed by effectively utilizing a valley that has been formed by the two tubes 24 having a cylindrical shape, and therefore a reduction in size of the shield connector 1 can be achieved. As illustrated in FIGS. 10 and 11, the pillar 45 of the holder 4 is inserted into the hollow portion 27b of the housing 2. In the holder 4, the first engaging piece 41 and the pillar 45 sandwich the connecting wall 27.

In a state where the housing 2 and the holder 4 are coupled to each other, the first facing wall W1 of the housing 2 faces the first end face 50a of the shell 5. In a case where the holder 4 moves relative to the shell 5 in a direction X2 in which the holder 4 gets out, the first facing wall W1 abuts onto the first end face 50a. The first end face 50a latches the first facing wall W1 together, and regulates the falling of the holder 4. Note that the second fitting portion 22 of the housing 2 may be pressed in the shell 5. The shell 5 may include a latching portion that latches the second fitting portion 22 together and positions the second fitting portion 22. These configurations can more reliably regulate a movement of the housing 2 in the direction X2 in which the holder 4 gets out.

In a state where the housing 2 and the holder 4 are coupled to each other, the second facing wall W2 of the holder 4 faces the second end face 50b of the shell 5. In a case where the housing 2 moves relative to the shell 5 in a direction X1 in which the housing 2 gets out, the second facing wall W2 abuts onto the second end face 50b. The second end face 50b latches the second facing wall W2 together, and regulates the falling of the housing 2.

The holder 4 according to the present embodiment causes the first engaging piece 41 to be engaged with the housing 2 from the outside, and causes the second engaging piece 42 to be engaged with the housing 2 from the inside. By employing such a firm coupling structure, the coupling of the housing 2 to the holder 4 is not easily released even if external force acts.

As described above, the shield connector 1 according to the present embodiment includes the housing 2 having a tubular shape, the sealing member 3 having an annular shape, the holder 4 that supports the sealing member 3, the shell 5 that has electric conductivity and has a tubular shape, and the braid 6 that is fixed to the outer peripheral face of the shell 5. The housing 2 includes the first engaging portion Lk1 and the first facing wall W1, and houses and holds the terminal 20. The sealing member 3 seals a gap between the outer peripheral face of the electric wire 7 that is connected to the terminal 20 and the inner wall face of the housing 2. The holder 4 includes the second engaging portion Lk2 that is engaged with the first engaging portion Lk1, and the second facing wall W2.

The shell 5 includes the first insertion opening 54 that the housing 2 is inserted into, the first end face 50a that surrounds the first insertion opening 54, the second insertion opening 55 that the holder 4 is inserted into, and the second end face 50b that surrounds the second insertion opening 55. The housing 2 and the holder 4 cause the first engaging portion Lk1 and the second engaging portion Lk2 to be engaged with each other inside the shell 5, cause the first facing wall W1 to face the first end face 50a, and cause the second facing wall W2 to face the second end face 50b, and the housing 2 and the holder 4 are coupled to each other.

In the shield connector 1 according to the present embodiment, a recess or protrusion for engagement does not need to be provided in a region of contact with the braid 6 in the shell 5. Accordingly, the shield connector 1 according to the present embodiment can stabilize an area of contact between the shell 5 and the braid 6. In addition, a size of the shell 5 can be reduced in a state where an area of contact between the shell 5 and the braid 6 is secured. Further, the number of poles in the shield connector 1 is easily expanded.

The housing 2 according to the present embodiment includes the plurality of tubes 24 that is arranged along the width direction Y, and houses the sealing member 3 in the tube 24. The first engaging portion Lk1 of the housing 2 includes the connecting wall 27 that connects two adjacent tubes 24 along the width direction Y. The second engaging portion Lk2 of the holder 4 includes the first engaging piece 41. The first engaging piece 41 is inserted into a space between the two adjacent tubes 24 along the axis direction X, and is engaged with the connecting wall 27. By disposing an engaging structure in the space between the two tubes 24, a size of the shield connector 1 can be reduced.

The first engaging portion Lk1 according to the present embodiment includes the engaging hole 25a that has been formed in the tube 24. The second engaging portion Lk2 includes the second engaging piece 42 that is inserted into the tube 24, and is engaged with the engaging hole 25a. The holder 4 is engaged with the housing 2 by using the first engaging piece 41 and the second engaging piece 42, and therefore a locking structure that is not easily released is achieved.

The holder 4 according to the present embodiment includes the body 43 having a plate shape. The body 43 is a closing wall that closes the second insertion opening 55. The second facing wall W2 is an outer edge of the body 43 serving as the closing wall. Such a configuration can simplify the holder 4.

Note that the configurations of the first engaging portion Lk1 and the second engaging portion Lk2 are not limited to the configurations described as an example. The first engaging portion Lk1 and the second engaging portion Lk2 can have an arbitrary configuration that causes the housing 2 to be coupled to the holder 4. The number of terminals 20 included in the shield connector 1 may be two or less, or may be four or more.

The shapes of, the first facing wall W1 and the second facing wall W2 are not limited to the shapes described as an example. For example, the second facing wall W2 may be divided into plural pieces. For example, the first facing wall W1 may be formed in a continuous annular shape that does not include the cutout 28.

The holder 4 does not need to be divided into the two supports 40. Stated another way, the holder 4 may be integrally molded to have a shape in which the two supports 40 are combined.

Pieces of content disclosed in the embodiment described above can be appropriately combined and implemented.

In a shield connector according to the embodiment, a housing and a holder cause a first engaging portion and a second engaging portion to be engaged with each other inside a shell, cause a first facing wall to face a first end face, and cause a second facing wall to face a second end face, and the housing and the holder are coupled to each other. Accordingly, a recess or protrusion for engagement with the housing or the holder is not needed in the shell. Thus, the shield connector according to the embodiment exhibits an effect by which an area of contact between the shell and a braid can be stabilized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A shield connector comprising:
a housing that includes a first engaging portion and a first facing wall, and houses and holds a terminal, the housing having a tubular shape;
a sealing member that seals a gap between an outer peripheral face of an electric wire and an inner wall face of the housing, the sealing member having an annular shape, the electric wire being connected to the terminal;
a holder that includes a second engaging portion and a second facing wall, and supports the sealing member, the second engaging portion being engaged with the first engaging portion;
a shell that includes a first insertion opening that the housing is inserted into, a first end face that surrounds the first insertion opening, a second insertion opening that the holder is inserted into, and a second end face that surrounds the second insertion opening, the shell having electric conductivity and having a tubular shape; and
a braid that is fixed to an outer peripheral face of the shell, wherein
the housing and the holder cause the first engaging portion and the second engaging portion to be engaged with each other inside the shell, cause the first facing wall to face the first end face, and cause the second facing wall to face the second end face, and the housing and the holder are coupled to each other.

2. The shield connector according to claim 1, wherein
the housing includes a plurality of tubes that is arranged along a width direction of the housing, and houses the sealing member in each of the plurality of tubes,
the first engaging portion includes a connecting wall that connects two adjacent tubes of the plurality of tubes along the width direction, and
the second engaging portion includes a first engaging piece that is inserted into a space between the two adjacent tubes, and is engaged with the connecting wall.

3. The shield connector according to claim 2, wherein
the first engaging portion includes an engaging hole that has been formed in each of the plurality of tubes, and
the second engaging portion includes a second engaging piece that is inserted into each of the plurality of tubes, and is engaged with the engaging hole.

4. The shield connector according to claim 3, wherein
the holder includes a closing wall that closes the second insertion opening, and
the second facing wall is an outer edge of the closing wall.

5. The shield connector according to claim 2, wherein
the holder includes a closing wall that closes the second insertion opening, and
the second facing wall is an outer edge of the closing wall.

6. The shield connector according to claim 1, wherein
the holder includes a closing wall that closes the second insertion opening, and
the second facing wall is an outer edge of the closing wall.

* * * * *